(12) United States Patent
Minami et al.

(10) Patent No.: US 11,024,835 B2
(45) Date of Patent: Jun. 1, 2021

(54) POSITIVE ELECTRODE FOR LITHIUM ION BATTERY AND LITHIUM ION BATTERY

(71) Applicant: NISSAN MOTOR CO., LTD., Yokohama (JP)

(72) Inventors: Kazuya Minami, Kanagawa (JP); Yusuke Nakashima, Kanagawa (JP); Yasuhiko Ohsawa, Kanagawa (JP); Yuki Kusachi, Kanagawa (JP); Hajime Satou, Kanagawa (JP); Hiroshi Akama, Kanagawa (JP); Hideaki Horie, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 83 days.

(21) Appl. No.: 16/346,337

(22) PCT Filed: Nov. 7, 2017

(86) PCT No.: PCT/JP2017/040164
§ 371 (c)(1),
(2) Date: Apr. 30, 2019

(87) PCT Pub. No.: WO2018/084320
PCT Pub. Date: May 11, 2018

(65) Prior Publication Data
US 2019/0267610 A1    Aug. 29, 2019

(30) Foreign Application Priority Data

Nov. 7, 2016 (JP) .............................. JP2016-217174
Oct. 20, 2017 (JP) .............................. JP2017-203993

(51) Int. Cl.
*H01M 6/04* (2006.01)
*H01M 4/13* (2010.01)
*H01M 4/36* (2006.01)
*H01M 4/62* (2006.01)
*H01M 4/66* (2006.01)
*H01M 10/0525* (2010.01)
*H01M 10/0568* (2010.01)
*H01M 10/0566* (2010.01)
*H01M 4/02* (2006.01)

(52) U.S. Cl.
CPC ............. *H01M 4/13* (2013.01); *H01M 4/366* (2013.01); *H01M 4/62* (2013.01); *H01M 4/622* (2013.01); *H01M 4/667* (2013.01); *H01M 4/668* (2013.01); *H01M 10/0525* (2013.01); *H01M 10/0566* (2013.01); *H01M 10/0568* (2013.01); *H01M 2004/021* (2013.01); *H01M 2004/028* (2013.01); *H01M 2300/002* (2013.01); *H01M 2300/0022* (2013.01)

(58) Field of Classification Search
CPC .......... H01M 4/13; H01M 4/366; H01M 4/62; H01M 4/622; H01M 4/667; H01M 4/668; H01M 10/0525; H01M 10/0566; H01M 10/0568; H01M 2004/021; H01M 2004/028; H01M 2300/002; H01M 2300/0022
See application file for complete search history.

(56) References Cited

U.S. PATENT DOCUMENTS

| 6,432,585 | B1 | 8/2002 | Kawakami et al. |
| 2002/0028380 | A1 | 3/2002 | Tanjo et al. |
| 2012/0321947 | A1 | 12/2012 | Goto et al. |
| 2015/0311512 | A1* | 10/2015 | Paulsen ............... H01M 10/052 429/219 |
| 2016/0149216 | A1 | 5/2016 | Mizuno et al. |
| 2016/0149224 | A1 | 5/2016 | Okuno et al. |
| 2016/0240848 | A1 | 8/2016 | Asano et al. |
| 2016/0351877 | A1 | 12/2016 | Kusachi et al. |
| 2018/0048023 | A1 | 2/2018 | Ohsawa et al. |

FOREIGN PATENT DOCUMENTS

| JP | 11-242954 A | 9/1999 |
| JP | 2002-151055 A | 5/2002 |
| JP | 2007-184261 A | 7/2007 |
| JP | 2012-138322 A | 7/2012 |
| JP | 2013-84590 A | 5/2013 |
| JP | 2015-11823 A | 1/2015 |
| JP | 2016-154137 A | 8/2016 |
| WO | WO 2011/036759 A1 | 3/2011 |
| WO | WO 2013/128679 A1 | 9/2013 |
| WO | WO 2015/005117 A1 | 1/2015 |
| WO | WO 2015/118988 A1 | 8/2015 |
| WO | WO 2016/104679 A1 | 6/2016 |

* cited by examiner

*Primary Examiner* — Jane J Rhee
(74) *Attorney, Agent, or Firm* — Foley & Lardner LLP

(57) ABSTRACT

To provide a positive electrode for a lithium ion battery having high energy density and being capable of rapid discharging.
A positive electrode for a lithium ion battery, the positive electrode including a positive electrode current collector, a positive electrode active material layer formed on the surface of the positive electrode current collector, and a non-aqueous liquid electrolyte including an electrolyte containing lithium ions and a non-aqueous solvent, in which the positive electrode active material layer includes a positive electrode active material and voids, the voids are filled with the non-aqueous liquid electrolyte, and a proportion of the battery capacity based on a total amount of lithium ions in the non-aqueous liquid electrolyte existing in the positive electrode active material layer with respect to the battery capacity based on a total amount of the positive electrode active material is 3.5 to 15%.

12 Claims, No Drawings

POSITIVE ELECTRODE FOR LITHIUM ION BATTERY AND LITHIUM ION BATTERY

TECHNICAL FIELD

The present invention relates to a positive electrode for a lithium ion battery, and a lithium ion battery.

BACKGROUND ART

In recent years, reduction of the amount of carbon dioxide emission is eagerly desired for the purpose of environmental protection. In the automobile industry, expectations have been attracted to the reduction of the amount of carbon dioxide emission by introduction of electric vehicles (EV) or hybrid electric vehicles (HEV), and the development of secondary batteries for motor driving, which holds the key to practical utilization of these, is being assiduously carried out. As the secondary batteries, attention is being paid to lithium ion secondary batteries, which can achieve high energy density and high power output density.

With regard to lithium ion secondary batteries, further enhancement of battery characteristics such as power output is demanded, and various investigations have been conducted. For example, a lithium ion battery that uses $Li_2Mn_{(1-2x)}Ni_xMo_xO_3$ (provided that $0<x<0.4$) as a positive electrode active material in order to increase the energy density is known (see, for example, JP 2016-154137 A).

SUMMARY OF INVENTION

Technical Problem

On the other hand, it is also demanded to cope with rapid discharging. However, generally, in order to enable rapid discharging without decreasing the energy density of a battery, it is necessary to make constituent parts other than an electrode active material layer (a positive electrode active material layer or a negative electrode active material layer), for example, a separator or a current collector, in the form of thin film. However, when the separator is made too thin, there is a problem that an internal short circuit is likely to occur due to precipitated lithium. When the current collector is made too thin, there is a problem that the internal resistance of the battery is increased. That is, when it is attempted to increase the rate of discharging by making electrodes into thin films, there is a problem that the volume occupied by separators and current collectors in the battery as a whole increases, and the energy density of the battery as a whole is decreased. Furthermore, when the amount of the positive electrode active material per unit volume is increased (filling density of the positive electrode active material is increased) in order to increase the energy density of an electrode that has been made into a thin film, there is a problem that the amount of a non-aqueous liquid electrolyte existing around the positive electrode active material is relatively decreased, and rapid discharging cannot be coped with. Therefore, there has been a problem to be solved that even for a conventional battery for which the capacity can be increased as described in JP 2016-154137 A or the like, it is difficult to achieve both the coping with rapid discharging and an increase of capacity (increase of energy density).

The present invention was attempted in order to solve the problem described above, and it is an object to provide a positive electrode for a lithium ion battery, which has high energy density and is capable of rapid discharging.

Solution to Problem

The inventors of the present invention conducted a thorough investigation in order to solve the problems described above, and as a result, the inventors achieved the present invention. That is, the present invention relates to a positive electrode for a lithium ion battery, the positive electrode including a positive electrode current collector, a positive electrode active material layer formed on the surface of the positive electrode current collector, and a non-aqueous liquid electrolyte including an electrolyte that includes lithium ions and a non-aqueous solvent, in which the positive electrode active material layer includes a positive electrode active material and voids, the voids are filled with the non-aqueous liquid electrolyte, and a proportion of the battery capacity based on a total amount of lithium ions in the non-aqueous liquid electrolyte existing in the positive electrode active material layer with respect to the battery capacity based on a total amount of the positive electrode active material is 3.5 to 15%; and to a lithium ion battery using the same.

DESCRIPTION OF EMBODIMENTS

Hereinafter, the present invention will be described in detail. In addition, in a case where the description of lithium ion battery is given in the present specification, the description is considered as a concept that also includes a lithium ion secondary battery.

The present invention is a positive electrode for a lithium ion battery, the positive electrode including a positive electrode current collector; a positive electrode active material layer formed on the surface of the positive electrode current collector; and a non-aqueous liquid electrolyte that includes an electrolyte including lithium ions and a non-aqueous solvent, in which the positive electrode active material layer includes a positive electrode active material and voids, the voids are filled with the non-aqueous liquid electrolyte, and a proportion of the battery capacity based on a total amount of lithium ions in the non-aqueous liquid electrolyte existing in the positive electrode active material layer with respect to the battery capacity based on a total amount of the positive electrode active material is 3.5 to 15%. When the positive electrode for a lithium ion battery of the present invention is used, a lithium ion battery having high energy density and excellent rapid discharging characteristics can be obtained. Meanwhile, the expression "X to Y" representing a range in the present specification includes X and Y and means "more than or equal to X and less than or equal to Y".

With regard to the problems of a lithium ion battery in which the electrodes are made into thin films by a conventional method, the inventors conducted a thorough study, and it was suspected that the problems are caused by a decrease in the number of lithium ions existing around the positive electrode active material, along with production of electrodes into thin films.

In the related art technologies, it is thought that when the distance between a positive electrode and a negative electrode is shortened as a result of production of a separator into a thin film, the distance of diffusion of lithium ions is shortened, and rapid discharging can be coped with.

On the other hand, in order to increase the energy density of this, when the filling density of the positive electrode active material is increased, it is thought that the amount of non-aqueous liquid electrolyte existing around the positive electrode active material is relatively decreased, and rapid discharging cannot be coped with. Furthermore, in a case where the amount of the positive electrode active material is increased without increasing the filling density of the positive electrode active material, it is thought that since the distance between the positive electrode and the negative electrode becomes long, time is taken to diffuse lithium ions, and rapid discharging cannot be coped with.

What becomes a problem upon rapid discharging is the migration speed (also referred to as diffusion rate) of lithium ions from the negative electrode to the positive electrode in the interior of the lithium ion battery; however, in a case where a sufficient amount of lithium ions exist around the positive electrode active material, when a discharging reaction is initiated, first, lithium ions existing around the positive electrode active material are incorporated into the positive electrode active material. In a case where even though lithium ions around the positive electrode active material are incorporated into the positive electrode active material, discharging is not finished, it is thought that lithium ions liberated from the negative electrode are incorporated into the positive electrode active material, and a discharging reaction proceeds.

Here, since lithium ions existing around the positive electrode active material prior to the initiation of discharging are such that the distance between the lithium ions and the positive electrode active material comes very close, it is thought that rapid discharging can be coped with. Meanwhile, in order for the lithium ions existing in the negative electrode to be incorporated into the positive electrode, the lithium ions need to migrate between the positive electrode and the negative electrode. Therefore, the diffusion rate of lithium ions becomes a rate-limiting factor, and there is a problem that rapid discharging cannot be coped with.

In this regard, in the positive electrode for a lithium ion battery of the present invention, voids existing in the vicinity of the positive electrode active material are filled with a non-aqueous liquid electrolyte, and the proportion (battery capacity proportion) of the battery capacity based on the total amount of lithium ions in the non-aqueous liquid electrolyte existing in the positive electrode active material layer, with respect to the battery capacity based on the total amount of the positive electrode active material, is 3.5 to 15%. Therefore, it can be said that lithium ions capable of coping with rapid discharging exist sufficiently around the positive electrode active material. That is, when the volume proportion occupied by the positive electrode active material layer in the battery as a whole is increased by making the thickness of the positive electrode active material layer thick, time is needed until lithium ions supplied from the negative electrode active material are stored in the entire positive electrode active material. In this regard, in the present invention, since the battery capacity proportion has a value greater than or equal to a certain value, it can be said that a sufficient amount of lithium ions exists in advance around the positive electrode active material. Therefore, it is thought that as the lithium ions existing around the positive electrode active material are incorporated into the positive electrode active material instead of the lithium ions supplied from the negative electrode active material, rapid discharging can be coped with. When the proportion of the battery capacity based on the total amount of lithium ions in the non-aqueous liquid electrolyte existing in the positive electrode active material layer is less than 3.5%, lithium ions capable of coping with rapid discharging around the positive electrode active material are not sufficient, and when the proportion is more than 15%, the rapid discharging characteristics are deteriorated owing to an increase in the solution resistance caused by increased concentration of the liquid electrolyte, or precipitation of a lithium salt. The battery capacity proportion is preferably 5% to 10%.

Furthermore, although the details are not clearly understood, in the present invention, a concentration gradient of lithium ions occurs between the negative electrode and the positive electrode at the time of discharging, and it is speculated that the discharging characteristics (rapid discharging characteristics) are enhanced also when this concentration gradient becomes the driving force for the migration of lithium ions.

Meanwhile, the battery capacity based on the total amount of the positive electrode active material is the theoretical battery capacity based on the weight of the positive electrode active material constituting the positive electrode active material layer. However, the theoretical value of the battery capacity refers to a value to the extent that can endure repeated charge and discharge.

Furthermore, the battery capacity based on the total amount of lithium ions in the non-aqueous liquid electrolyte existing in the positive electrolyte active material layer is the battery capacity (discharge capacity) at the time of assuming that all lithium ions in the non-aqueous liquid electrolyte included in the positive electrode active material layer have been inserted and stored in the positive electrode active material. In the lithium ions used for the calculation of the discharge capacity, the lithium ions included in advance in the positive electrode active material at the time of full charging (before discharging) are not included.

The battery capacity based on the total amount of the positive electrode active material is calculated according to the following formula:

$$\text{Battery capacity } [\text{mAh/cm}^2] = \text{Capacity of positive electrode active material } [\text{mAh/g}] \times \text{weight per unit area of positive electrode active material } [\text{mg/cm}^2]/10^3$$

Meanwhile, the capacity of the positive electrode active material [mAh/g] is obtained by mixing the positive electrode active material (in a case where the positive electrode active material is a coated positive electrode active material coated with a coating layer containing a polymer compound, the coated positive electrode active material) with a non-aqueous liquid electrolyte produced by dissolving $LiN(FSO_2)_2$ in a mixed solvent of ethylene carbonate (EC) and diethyl carbonate (DEC) (volume ratio 1:1) at a proportion of 3 mol/L so as to slurrify the mixture, applying the slurry on one surface of an aramid separator [manufactured by Japan Vilene Co., Ltd.], subsequently pressing the resultant for 10 seconds at a pressure of 10 MPa to produce an electrode, incorporating the electrode into a battery pack in a state in which the electrode is caused to face a counter electrode (metal lithium), with a separator being interposed therebetween, and measuring the discharge capacity at the time of discharging from 4.2 V to 2.5 V (discharging rate: 1/20 C) at room temperature using a charge-discharge analyzer, "Battery Analyzer Type 1470" [manufactured by TOYO Corporation] or the like.

The battery capacity based on the total amount of lithium ions in the non-aqueous liquid electrolyte existing in the positive electrode active material layer can be derived unambiguously from the thickness and porosity of the positive electrode active material layer and the electrolyte concentration of the non-aqueous liquid electrolyte, and can be adjusted by combining these as appropriate. The calculation formula is as follows:

Battery capacity [mAh/cm$^2$] based on total amount of lithium ions in non-aqueous liquid electrolyte existing in positive electrode active material layer=Electrode void volume [cm$^3$]×the electrolyte concentration of non-aqueous liquid electrolyte [mol/L]/10$^3$×capacity conversion constant [mAh/mol]/electrode area [cm$^2$]

Capacity conversion constant [mAh/mol]: 26806 In addition, the capacity conversion constant represents a battery capacity per lithium ion.

Electrode void volume [cm$^3$]=Porosity [volume %]×film thickness of electrode [μm]/10$^4$×electrode area [cm$^2$]

The proportion (battery capacity proportion) of the battery capacity based on the total amount of lithium ions in the non-aqueous liquid electrolyte existing in the positive electrode active material layer with respect to the battery capacity based on the total amount of the positive electrode active material can be controlled by means of the type of the positive electrode active material, the weight per unit area of the positive electrode active material in the positive electrode active material layer, the porosity of the positive electrode active material layer, the electrolyte concentration of the non-aqueous liquid electrolyte, and the like.

For example, when the weight per unit area of the positive electrode active material layer is increased, or the porosity is decreased, the battery capacity based on het total amount of the positive electrode active material increases, and the battery capacity proportion decreases. On the other hand, when the electrolyte concentration of the non-aqueous liquid electrolyte is increased, or the porosity of the positive electrode active material layer is increased, the battery capacity based on the total amount of lithium ions in the non-aqueous liquid electrolyte existing in the positive electrode active material layer increases, and the battery capacity proportion increases.

As the positive electrode active material that constitutes the positive electrode for a lithium ion battery of the present invention, a positive electrode active material that has been conventionally used as an active material for a positive electrode of a lithium ion battery can be suitably used.

Examples of the positive electrode active material include composite oxides of lithium and transition metals {composite oxides with one kind of transition metal ($LiCoO_2$, $LiNiO_2$, $LiAlMnO_4$, $LiMnO_2$, $LiMn_2O_4$, and the like), composite oxides with two kinds of transition metal elements (for example, $LiFeMnO_4$, $LiNi_{1-x}Co_xO_2$ (provided that $0<x<1$), $LiMn_{1-y}Co_yO_2$ (provided that $0<y<1$), $LiNi_{1/3}CO_{1/3}Al_{1/3}O_2$, and $LiNi_{0.8}Co_{0.15}Al_{0.05}O_2$), and composite oxides with three or more kinds of metal elements [for example, $LiM_aM'_bM''_cO_2$ (M, M', and M'' are respectively different transition metal elements, and a+b+c=1 is satisfied. For example, $LiNi_{1/3}Mn_{1/3}Co_{1/3}O_2$) and the like] and the like}, lithium-containing transition metal phosphates (for example, $LiFePO_4$, $LiCoPO_4$, $LiMnPO_4$, and $LiNiPO_4$), transition metal oxides (for example, $MnO_2$ and $V_2O_5$), transition metal sulfides (for example $MoS_2$ and $TiS_2$), electroconductive polymers (for example, polyaniline, polypyrrole, polythiophene, polyacetylene, poly-p-phenylene, and polyvinylcarbazole), and the like. Two or more kinds may be used in combination. Meanwhile, the lithium-containing transition metal phosphates may be compounds obtained by substituting a portion of the transition metal sites with other transition metals.

A volume average particle size of the positive electrode active material is, from the viewpoint of the electrical characteristics of the battery, preferably 0.01 to 100 μm, more preferably 0.1 to 35 μm, and even more preferably 2 to 30 μm.

In the present specification, the volume average particle size of the positive electrode active material means the particle size (Dv50) at a cumulative value of 50% in a particle size distribution determined according to a Microtrac method (laser diffraction and scattering method). The Microtrac method is a method for determining a particle size distribution by utilizing scattered light that is obtainable by irradiating particles with laser light. Incidentally, MicroTrac manufactured by Nikkiso Co., Ltd., and the like can be used for the measurement of the volume average particle size.

In the positive electrode for a lithium ion battery of the present invention, the positive electrode active material layer includes a positive electrode active material and voids. As the positive electrode active material layer includes voids, and the non-aqueous liquid electrolyte including lithium ions is filled into the voids, a sufficient amount of lithium ions can be disposed around the positive electrode active material.

The volume of the voids in the positive electrode active material layer is not particularly limited as long as the battery capacity based on the total amount of lithium ions in the non-aqueous liquid electrolyte existing in the positive electrode active material layer becomes 3.5 to 15% of the battery capacity based on the total amount of the positive electrode active material; however, it is preferable that the total volume of the voids is 35% to 60% by volume, and more preferably 35% to 50% by volume, of the total volume of the positive electrode active material layer. When voids at a proportion of 35% to 60% by volume of the total volume are formed within the positive electrode active material layer, a sufficient amount of lithium ions can be disposed around the positive electrode active material by filling the voids with the non-aqueous liquid electrolyte.

In the present specification, voids refer to voids possessed by the positive electrode active material layer in a state in which the positive electrode is not impregnated with the non-aqueous liquid electrolyte. The porosity can also be determined by an image analysis of a cross-section of the positive electrode active material layer by X-ray computed tomography (CT) or the like.

However, in a case where the positive electrode active material layer includes a liquid electrolyte or other components, and X-ray CT images of the positive electrode active material layer including voids cannot be obtained, measurement should be made by the following method.

The porosity can be calculated by dividing the respective weights of various solid components (excluding an electrolyte) constituting a positive electrode active material layer having a certain volume, by the respective true densities of the components; subtracting the total value of the volume values of the various components thus obtainable, from the volume of the positive electrode active material layer; and further dividing the value thus obtainable, by the volume of the positive electrode active material layer.

The weights and true densities of various solid components can be determined by subjecting a cleaning liquid obtained by cleaning the positive electrode with a non-aqueous solvent or the like, to solid-liquid separation, and eliminating the non-aqueous solvent.

Meanwhile, regarding the above-mentioned solid components, the method may be changed to a method of measuring the weight and true density for each of the components by using the solid components as a mixture, without separating the solid components into components that dissolve in a non-aqueous solvent and components that do not dissolve, dividing the weight of the mixture by the true density, and thereby determining the volume of the solid components as a whole.

The thickness of the positive electrode active material layer (hereinafter, also simply referred to as film thickness) is not particularly limited; however, from the viewpoint of achieving a balance between the energy density and the input and output characteristics, the thickness is preferably more than or equal to 100 μm to less than or equal to 900 μm, more preferably more than or equal to 150 μinto less than or equal to 600 μm, and even more preferably more than or equal to 200 μm to less than or equal to 400 μm.

The amount of the non-aqueous liquid electrolyte that can be retained per unit area by the positive electrode active material layer is not particularly limited; however, the amount is preferably 6 to 120 μL/cm$^2$. Meanwhile, the plane that serves as a reference per unit area is a plane parallel to the surface of the positive electrode current collector. When the amount of the non-aqueous liquid electrolyte that can be retained per unit area by the positive electrode active material layer is 6 μL/cm$^2$ or more, the total amount of lithium ions existing around the positive electrode active material can be sufficiently obtained, and rate characteristics become excellent. The amount of the non-aqueous liquid electrolyte that can be retained per unit area can be determined by calculating the amount from the porosity and film thickness of the positive electrode active material layer.

The positive electrode current collector is not particularly limited; however, examples include copper, aluminum, titanium, stainless steel, nickel, calcined carbon, a material in which an electrically conductive material has been added as necessary into an electroconductive polymer (polymer having an electron conductive skeleton) or a non-electroconductive polymer material as a resin, a foil containing an electroconductive material such as electroconductive glass, and the like. Furthermore, a foil formed by coating a metal surface with aluminum, or a carbon-coated aluminum foil may also be used. Among them, from the viewpoint of safety, it is preferable to use, as the positive electrode current collector, a resin current collector containing an electroconductive material and a resin.

The electrically conductive material to be included in the resin current collector is selected from materials having electrical conductivity. Specifically, examples include metals [nickel, aluminum, stainless steel (SUS), silver, copper, titanium, and the like], carbon [graphite, carbon black (acetylene black, Ketjen black, furnace black, channel black, thermal lamp black, and the like), and the like], mixtures of these, and the like; however, the electrically conductive material is not limited to these.

These electrically conductive materials may be used singly, or two or more kinds may be used in combination. Furthermore, alloys or metal oxides of the above-mentioned metals may also be used. From the viewpoint of electrical stability, preferred examples include aluminum, stainless steel, carbon, silver, copper, titanium, and mixtures thereof; more preferred examples include silver, aluminum, stainless steel, and carbon; and an even more preferred example is carbon. Furthermore, these electrically conductive materials may also be materials obtained by coating particulate ceramic materials or resin materials with electroconductive materials (metallic materials among the materials of the electrically conductive materials mentioned above) by plating or the like.

The average particle size of the electrically conductive material is not particularly limited; however, from the viewpoint of the electrical characteristics of the battery, the average particle size is preferably 0.01 to 10 μm, more preferably 0.02 to 5 μm, and even more preferably 0.03 to 1 μm. Meanwhile, the "particle size/of an electrically conductive material" means the maximum distance among the distances between any arbitrary two points on the contour line of the electrically conductive material. As the value of the "average particle size", a value calculated as an average value of the particle sizes of particles observed in several to several tens visual fields using an observation means such as scanning electron microscopy (SEM) or transmission electron microscopy (TEM), is to be employed.

The shape (form) of the electrically conductive material is not limited to a particulate form, and may be a form other than a particulate form, or may also be a form that has been practicalized as a so-called filler-based electroconductive resin composition, such as carbon nanofiller or carbon nanotubes.

The electrically conductive material may be an electroconductive fiber whose shape is fibrous. Examples of the electroconductive fiber include carbon fibers such as a PAN-based carbon fiber and a pitch-based carbon fiber; an electroconductive fiber obtained by uniformly dispersing a highly electroconductive metal or graphite in synthetic fibers; a metal fiber obtained by fiberizing a metal such as stainless steel; an electroconductive fiber obtained by coating the surface of an organic fiber with a metal; an electroconductive fiber obtained by coating the surface of an organic fiber with a resin including an electroconductive material; and the like. Among these electroconductive fibers, carbon fibers are preferred. Furthermore, a polypropylene resin kneaded with grapheme is also preferable. In a case where the electrically conductive material is an electroconductive fiber, the average fiber diameter thereof is preferably 0.1 to 20 μm.

Examples of the resin that is included in a resin current collector include polyethylene (PE), polypropylene (PP), polymethylpentene (PMP), polycycloolefin (PCO), polyethylene terephthalate (PET), polyether nitrile (PEN), polytetrafluoroethylene (PTFE), styrene-butadiene rubber (SBR), polyacrylonitrile (PAN), polymethyl acrylate (PMA), polymethyl methacrylate (PMMA), polyvinylidene fluoride (PVdF), an epoxy resin, a silicone resin, mixtures thereof, and the like.

From the viewpoint of electrical stability, polyethylene (PE), polypropylene (PP), polymethylpentene (PMP), and polycycloolefin (PCO) are preferred; and more preferred are polyethylene (PE), polypropylene (PP), and polymethylpentene (PMP).

As the non-aqueous liquid electrolyte, a non-aqueous liquid electrolyte including an electrolyte and a non-aqueous solvent, which is used for the production of lithium ion batteries, can be used.

As the electrolyte, an electrolyte that is used in known liquid electrolytes, or the like can be used. Preferred examples include inorganic acid lithium salt-based electrolytes such as $LiPF_6$, $LiBF_4$, $LiSbF_6$, $LiAsF_6$, and $LiClO_4$; fluorine atom-containing sulfonylimide-based electrolytes such as $LiN(FSO_2)_2$, $LiN(CF_3SO_2)_2$, and $LiN(C_2F_5SO_2)_2$; fluorine atom-containing sulfonylmethide-based electrolytes such as $LiC(CF_3SO_2)_3$; and the like. Among these, preferred from the viewpoints of the ion conductivity at a high concentration and the thermal decomposition temperature is a fluorine atom-containing sulfonylimide-based electrolyte, and LiN(FSO$_2$)$_2$ is more preferred. LiN(FSO$_2$)$_2$ may be used in combination with another electrolyte; however, it is more preferable to be used alone.

The electrolyte concentration of the non-aqueous liquid electrolyte is not particularly limited; however, from the viewpoints of handleability of the non-aqueous liquid electrolyte, battery capacity, and the like, the electrolyte concentration is preferably 1 to 5 mol/L, more preferably 1.5 to 4 mol/L, and even more preferably 2 to 3 mol/L.

As the non-aqueous solvent, such a solvent that is used in known non-aqueous liquid electrolytes or the like can be used, and for example, a lactone compound, a cyclic or chain-like carbonic acid ester, a chain-like carboxylic acid ester, a cyclic or chain-like ether, a phosphoric acid ester, a nitrile compound, an amide compound, a sulfone, and mixtures thereof can be used.

As the lactone compound, 5-membered ring (γ-butyrolactone, γ-valerolactone, and the like) and 6-membered ring lactone compounds (δ-valerolactone and the like), and the like can be mentioned.

Examples of the cyclic carbonic acid ester include propylene carbonate, ethylene carbonate, butylene carbonate, and the like.

Examples of the chain-like carbonic acid ester include dimethyl carbonate, methyl ethyl carbonate, diethyl carbonate, methyl-n-propyl carbonate, ethyl-n-propyl carbonate, di-n-propyl carbonate, and the like.

Examples of the chain-like carboxylic acid ester include methyl acetate, ethyl acetate, propyl acetate, methyl propionate, and the like.

Examples of the cyclic ether include tetrahydrofuran, tetrahydropyran, 1,3-dioxolane, 1,4-dioxane, and the like.

Examples of the chain-like ether include dimethoxymethane, 1,2-dimethoxyethane, and the like.

Examples of the phosphoric acid ester include trimethyl phosphate, triethyl phosphate, ethyldimethyl phosphate, diethylmethyl phosphate, tripropyl phosphate, tributyl phosphate, tri(trifluoromethyl) phosphate, tri(trichloromethyl) phosphate, tri(trifluoroethyl) phosphate, tri(triperfluoroethyl) phosphate, 2-ethoxy-1,3,2-dioxaphospholan-2-one, 2-trifluoroethoxy-1,3,2-dioxaphospholan-2-one, 2-methoxyethoxy-1,3,2-dioxaphospholan-2-one, and the like.

Examples of the nitrile compound include acetonitrile and the like. Examples of the amide compound include N,N-dimethylformamide (hereinafter, described as DMF) and the like. Examples of the sulfone include chain-like sulfones such as dimethylsulfone and diethylsulfone, cyclic sulfones such as sulfolane, and the like.

The non-aqueous solvents may be used singly, or two or more kinds may be used in combination.

Among the non-aqueous solvents, preferred examples from the viewpoints of the battery power output and the charge-discharge cycle characteristics include a lactone compound, a cyclic carbonic acid ester, a chain-like carbonic acid ester, and a phosphoric acid ester, and it is preferable that a nitrile compound is not included. More preferred are a lactone compound, a cyclic carbonic acid ester, and a chain-like carbonic acid ester, and particularly preferred is a mixed liquid of a cyclic carbonic acid ester and a chain-like carbonic acid ester. Most preferred is a mixed liquid of ethylene carbonate (EC) and dimethyl carbonate (DMC), or a mixed liquid of ethylene carbonate (EC) and diethyl carbonate (DEC).

The positive electrode active material layer may further include an electrically conductive material. As the electrically conductive material, for example, electroconductive fibers may be mentioned.

In a case where the positive electrode active material layer further includes electroconductive fibers, the electroconductive fibers can have a function of assisting electron conduction into the positive electrode active material layer, and the same one as the electroconductive fibers described for the resin current collector can be used. In a case where the positive electrode active material layer further includes electroconductive fibers, it is preferable to use a coated positive electrode active material that will be described below, as the positive electrode active material. In a case where the positive electrode active material layer further includes electroconductive fibers, it is preferable that the content of the electroconductive fibers included in the positive electrode active material layer is 25% by weight or less with respect to the total weight of the positive electrode active material layer.

However, it is also acceptable, of course, to use an electrically conductive agent that does not have a fibrous form. For example, an electrically conductive agent having a particulate form (for example, a spherical form) can be used. In a case where the electrically conductive agent is in a particulate form, the shape of the particles is not particularly limited, and any shape, such as a powder form, a spherical form, a sheet-form, a pillar-form, an irregular shape, a scaly form, or a conical form, may be employed. As the electrically conductive agent having a particulate form (for example, a spherical form), the same one as the electrically conductive material described for the resin current collector can be used.

It is preferable for the positive electrode active material that a portion or the entirety of the surface is coated with a coating layer containing a polymer compound.

A positive electrode active material having a portion or the entirety of the surface coated with a coating layer is also referred to as coated positive electrode active material. When the surface of the positive electrode active material is coated with a coating layer, volume change of the positive electrode is mitigated, and expansion of the positive electrode can be suppressed. Furthermore, wettability of the positive electrode active material to a non-aqueous solvent can be enhanced.

As the polymer compound that constitutes a coating layer, a polymer compound having a liquid absorption ratio at the time of being immersed in a non-aqueous liquid electrolyte of 10% or higher, and having a tensile elongation at break in a state of saturated liquid absorption of 10% or higher, is preferable.

The liquid absorption ratio at the time of being immersed in a non-aqueous liquid electrolyte can be determined by the following formula, by measuring the weights of the polymer compound before being immersed and after being immersed in the non-aqueous liquid electrolyte:

Liquid absorption ratio (%)=[(Weight of polymer compound after being immersed in non-aqueous liquid electrolyte−weight of polymer compound before being immersed in non-aqueous liquid electrolyte)/weight of polymer compound before being immersed in non-aqueous liquid electrolyte]×100

As the non-aqueous liquid electrolyte for determining the liquid absorption ratio, a non-aqueous liquid electrolyte having LiPF$_6$ as an electrolyte dissolved at a concentration of 1 mol/L in a mixed solvent obtained by mixing ethylene carbonate (EC) and diethyl carbonate (DEC) at a volume ratio of EC:DEC=3:7, is used.

Immersion in the non-aqueous liquid electrolyte at the time of determining the liquid absorption ratio is carried out for 3 days at 50° C. By performing immersion for 3 days at 50° C., the polymer compound is brought into a saturated liquid absorption state. Meanwhile, the saturated liquid absorption state refers to a state in which the weight of the polymer compound does not increase even if the polymer compound is immersed in the non-aqueous liquid electrolyte for a longer time.

Meanwhile, the non-aqueous liquid electrolyte used at the time of producing a lithium ion battery is not particularly limited to the above-mentioned non-aqueous liquid electrolyte, and other non-aqueous liquid electrolytes may be used.

When the liquid absorption ratio is 10% or higher, the polymer compound sufficiently absorbs the non-aqueous liquid electrolyte, and lithium ions can easily permeate through the polymer compound. Therefore, there is nothing disturbing the migration of lithium ions between the positive electrode active material and the non-aqueous liquid electrolyte. When the liquid absorption ratio is lower than 10%, since it is difficult for the non-aqueous liquid electrolyte to penetrate into the polymer compound, the conductivity for lithium ions is decreased, and the performance as a lithium ion battery may not be sufficiently exhibited. The liquid absorption ratio is more preferably 20% or higher, and even more preferably 30% or higher. Furthermore, a preferred upper limit of the liquid absorption ratio is 400%, and an even more preferred upper limit is 300%.

The tensile elongation at break in a saturated liquid absorption state can be measured according to ASTM D683 (specimen shape Type II), by punching a polymer compound into a dumbbell shape, performing immersion in a non-aqueous liquid electrolyte for 3 days at 50° C. in the same manner as the measurement of the liquid absorption ratio, and thereby bringing the polymer compound into a saturated liquid absorption state. The tensile elongation at break is a value obtained by calculating the elongation ratio until the specimen breaks during a tensile test, by the following formula:

Tensile elongation at break (%)=[(Specimen length at break−specimen length before test)/specimen length before test]×100

When the tensile elongation at break of the polymer compound in a saturated liquid absorption state is 10% or higher, since the polymer compound has adequate flexibility, it is easy to control the detachment of the coating layer caused by volume change of the positive electrode active material at the time of charging and discharging. The tensile elongation at break is more preferably 20% or higher, and even more preferably 30% or higher. Furthermore, a preferred upper limit of the tensile elongation at break is 400%, and a more preferred upper limit is 300%.

Subsequently, the polymer compound that constitutes the coating layer will be specifically described. The polymer compound that constitutes the coating layer may be a thermoplastic resin, a thermosetting resin, or the like, and examples include a vinyl resin, a urethane resin, a polyester resin, a polyamide resin, an epoxy resin, a polyimide resin, a silicone resin, a phenolic resin, a melamine resin, a urea resin, an aniline resin, an ionomer resin, a polycarbonate, a polysaccharide (sodium alginate or the like), mixtures thereof, and the like. Among these, a vinyl resin is preferred.

A vinyl resin is a resin formed to include a polymer (A1) having a vinyl monomer (a) as an essential constituent monomer.

Particularly, it is preferable that the polymer (A1) is a polymer of a monomer composition including a vinyl monomer (a1) having a carboxyl group or an acid anhydride group and a vinyl monomer (a2) represented by the following General Formula (1) as vinyl monomers (a):

$$CH_2=C(R^1)COOR^2 \qquad (1)$$

wherein in Formula (1), $R^1$ represents a hydrogen atom or a methyl group; and $R^2$ represents a linear alkyl group having 4 to 12 carbon atoms or a branched alkyl group having 4 to 36 carbon atoms.

Among vinyl resins, a vinyl resin having a liquid absorption ratio at the time of being immersed in a non-aqueous liquid electrolyte of 10% or higher and having a tensile elongation at break in a saturated liquid absorption state of 10% or higher is more preferred.

Examples of the vinyl monomer (a1) having a carboxyl group or an acid anhydride group include a monocarboxylic acid having 3 to 15 carbon atoms, such as (meth)acrylic acid (a11), crotonic acid, or cinnamic acid; a dicarboxylic acid having 4 to 24 carbon atoms, such as (anhydrous) maleic acid, fumaric acid, (anhydrous) itaconic acid, citraconic acid, or mesaconic acid; a trivalent, tetravalent, or higher-valent polycarboxylic acid having 6 to 24 carbon atoms, such as aconitic acid; and the like. Among these, (meth)acrylic acid (a11) is preferred, and methacrylic acid is more preferred. Meanwhile, (meth)acrylic acid indicates acrylic acid and/or methacrylic acid.

In regard to the vinyl monomer (a2) represented by General Formula (1), $R^1$ represents a hydrogen atom or a methyl group. It is preferable that $R^1$ is a methyl group. It is preferable that $R^2$ is a linear or branched alkyl group having 4 to 12 carbon atoms, or a branched alkyl group having 13 to 36 carbon atoms.

(a21) Ester compound in which $R^2$ is linear or branched alkyl group having 4 to 12 carbon atoms Examples of a linear alkyl group having 4 to 12 carbon atoms include a butyl group, a pentyl group, a hexyl group, a heptyl group, an octyl group, a nonyl group, a decyl group, an undecyl group, and a dodecyl group.

Examples of a branched alkyl group having 4 to 12 carbon atoms include a 1-methylpropyl group (sec-butyl group), a 2-methylpropyl group, a 1,1-dimethylethyl group (tert-butyl group), a 1-methylbutyl group, a 1,1-dimethylpropyl group, a 1,2-dimethylpropyl group, a 2,2-dimethylpropyl group (neopentyl group), a 1-methylpentyl group, a 2-methylpentyl group, a 3-methylpentyl group, a 4-methylpentyl group, a 1,1-dimethylbutyl group, a 1,2-dimethylbutyl group, a 1,3-dimethylbutyl group, a 2,2-dimethylbutyl group, a 2,3-dimethylbutyl group, a 1-ethylbutyl group, a 2-ethylbutyl group, a 1-methylhexyl group, a 2-methylhexyl group, a 2-methylhexyl group, a 4-methylhexyl group, a 5-methylhexyl group, a 1-ethylpentyl group, a 2-ethylpentyl group, a 3-ethylpentyl group, a 1,1-dimethylpentyl group, a 1,2-dimethylpentyl group, a 1,3-dimethylpentyl group, a 2,2-dimethylpentyl group, a 2,3-dimethylpentyl group, a 2-ethylpentyl group, a 1-methylheptyl group, a 2-methylheptyl group, a 3-methylheptyl group a 4-methylheptyl group, a 5-methylheptyl group, a 6-methylheptyl group, a 1,1-dimethylhexyl group, a 1,2-dimethylhexyl group, a 1,3-dimethylhexyl group, a 1,4-dimethylhexyl group, a 1,5-dimethylhexyl group, a 1-ethylhexyl group, a 2-ethylhexyl group, a 1-methyloctyl group a 2-methyloctyl group, a 3-methyloctyl group, a 4-methyloctyl group, a 5-methyloctyl group a 6-methyloctyl group, a 7-methyloctyl group, a 1,1-dimethylheptyl group, a 1,2-dimethylheptyl group a 1,3-dimethylheptyl group, a 1,4-dimethylheptyl group, a 1,5-dimethylheptyl group, a 1,6-dimethylheptyl group, a 1-ethylheptyl group, a 2-ethylheptyl group, a 1-methylnonyl group, a 2-methylnonyl group, a 3-methylnonyl group, a 4-methylnonyl group, a 5-methylnonyl group, a 6-methylnonyl group, a 7-methylnonyl group, an 8-methylnonyl group, a 1,1-dimethyloctyl group, a 1,2-dimethyloctyl group, a 1,3-dimethyloctyl group, a 1,4-dimethyloctyl group, a 1,5-dimethyloctyl group, a 1,6-dimethyloctyl group, a 1,7-dimethyloctyl group, a 1-ethyloctyl group, a 2-ethyloctyl group, a 1-methyldecyl group, a 2-methyldecyl group, a 3-methyldecyl group, a 4-methyldecyl group, a 5-methyldecyl group, a 6-methyldecyl group, a 7-methyldecyl group, an 8-methyldecyl group, a 9-methyldecyl group, a 1,1-dimethylnonyl group, a 1,2-dimethylnonyl group, a 1,3-dimethylnonyl group a 1,4-dimethylnonyl group, a 1,5-dimethylnonyl group, a 1,6-dimethylnonyl group, a 1,7-dimethylnonyl group, a 1,8-dimethylnonyl group a 1-ethylnonyl group, a 2-ethylnonyl group a 1-methylundecyl group, a 2-methylundecyl group, a 3-methylundecyl group, a 4-methylundecyl group, a 5-methylundecyl group, a 6-methylundecyl group, a 7-methylundecyl group, an 8-methyundecyl group, a 9-methylundecyl group, a 10-methylundecyl group, a 1,1-dimethyldecyl group, a 1,2-dimethyldecyl group, a 1,3-dimethyldecyl group, a 1,4-dimethyldecyl group, a 1,5-dimethyldecyl group, a 1,6-dimethyldecyl group, a 1,7-dimethyldecyl group, a 1,8-dimethyldecyl group, a 1,9-dimethyldecyl group, a 1-ethyldecyl group, a 2-ethyldecyl group, and the like. Among these, a 2-ethylhexyl group is preferred.

(a22) Ester compound in which $R^2$ is branched alkyl group having 13 to 36 carbon atoms Examples of a branched alkyl group having 13 to 36 carbon atoms include a 1-alkylalkyl group [a 1-methyldodecyl group, a 1-butyleicosyl group, a 1-hexyloctadecyl group a 1-octylhexadecyl group, a 1-decyltetradecyl group, a 1-undecyltridecyl group, or the like], a 2-alkylalkyl group [a 2-methyldodecyl group, a 2-hexyloctadecyl group, a 2-octylhexadecyl group, a 2-decyltetradecyl group, a 2-undecyltridecyl group, a 2-dodecylhexadecyl group, a 2-tridecylpentadecyl group, a 2-decyloctadecyl group, a 2-tetradecyloctadecyl group, a 2-hexadecyloctadecyl group, a 2-tetradecyleicosyl group, a 2-hexadecyleicosyl group, or the like], a 3- to 34-alkylalkyl group (a 3-alkylalkyl group, a 4-alkylalkyl group, a 5-alkylalkyl group, a 32-alkylalkyl group, a 33-alkylalkyl group, a 34-alkylalkyl group, or the like), and mixed alkyl groups including one or more branched alkyl groups, such as residues obtained by excluding hydroxyl groups from oxo alcohols obtainable from a propylene oligomer (7- to 11-mers), an ethylene/propylene (molar ratio 16/1 to 1/11) oligomer, an isobutylene oligomer (7- to 8-mers), an α-olefin (carbon number 5 to 20) oligomer (4- to 8-mers), and the like.

It is preferable that the polymer (A1) further contains an ester compound (a3) between a monohydric aliphatic alcohol having 1 to 3 carbon atoms and (meth)acrylic acid.

Examples of the monohydric aliphatic alcohol having 1 to 3 carbon atoms that constitute the ester compound (a3) include methanol, ethanol, 1-propanol, 2-propanol, and the like.

The content of the ester compound (a3) is, from the viewpoint of suppressing volume change in the positive electrode active material or the like, preferably 10% to 60% by weight, more preferably 15% to 55% by weight, and even more preferably 20% to 50% by weight, based on the total weight of the polymer (A1).

Furthermore, the polymer (A1) may further contain a salt (a4) of an anionic monomer having a polymerizable unsaturated double bond and an anionic group.

Examples of a structure having a polymerizable unsaturated double bond include a vinyl group, an allyl group, a styrenyl group, a (meth)acryloyl group, and the like.

Examples of the anionic group include a sulfonic acid group, a carboxyl group, and the like.

An anionic monomer having a polymerizable unsaturated double bond and an anionic group is a compound obtainable by combination of these, and examples include vinylsulfonic acid, allylsulfonic acid, styrenesulfonic acid, and (meth)acrylic acid.

Meanwhile, a (meth)acryloyl group means an acryloyl group and/or a methacryloyl group.

Examples of a cation that constitutes the salt (a4) of an anionic monomer include lithium ion, sodium ion, potassium ion, ammonium ion, and the like.

In a case where a salt (a4) of an anionic monomer is included, the content thereof is, from the viewpoint of internal resistance or the like, preferably 0.1% to 15% by weight, more preferably 1% to 15% by weight, and even more preferably 2% to 10% by weight, based on the total weight of the polymer compound.

It is preferable that the polymer (A1) contains (meth)acrylic acid (a11) and an ester compound (a21), and it is more preferable that the polymer (A1) contains an ester compound (a3). It is most preferable that the polymer (A1) is a copolymer of methacrylic acid, 2-ethylhexyl methacrylate, and methyl methacrylate, which uses methacrylic acid as the (meth)acrylic acid (a11), uses 2-ethylhexyl methacrylate as the ester compound (a21), and uses methyl methacrylate as the ester compound (a3).

It is preferable that the polymer compound is formed by polymerizing a monomer composition formed to include (meth)acrylic acid (a11), the above-mentioned vinyl monomer (a2), an ester compound (a3) of a monohydric aliphatic alcohol having 1 to 3 carbon atoms and (meth) acrylic acid, and a salt (a4) of an anionic monomer having a polymerizable unsaturated double bond and an anionic group, which is used as necessary, and the weight ratio of the vinyl monomer (a2) and the (meth)acrylic acid (a11) [the vinyl monomer (a2)/the (meth)acrylic acid (a11)] is 10/90 to 90/10.

When the weight ratio of the vinyl monomer (a2) and the (meth)acrylic acid (a11) is 10/90 to 90/10, a polymer formed by polymerizing this has satisfactory adhesiveness to a positive electrode active material and is not easily detachable.

The weight ratio is, for example, 20/80 to 85/15, preferably 30/70 to 85/15, and more preferably 40/60 to 70/30.

Furthermore, in the monomers that constitute the polymer (A1), in addition to a vinyl monomer (a1) having a carboxyl group or an acid anhydride group, a vinyl monomer (a2) represented by the General Formula (1), an ester compound (a3) of a monohydric aliphatic alcohol having 1 to 3 carbon atoms and (meth)acrylic acid, and a salt (a4) of an anionic monomer having a polymerizable unsaturated double bond and an anionic group, a radical-polymerizable monomer (a5) that can be copolymerized with a vinyl monomer (a1) having a carboxyl group or an acid anhydride group, a vinyl monomer (a2) represented by the General Formula (1), and an ester compound (a3) of a monohydric aliphatic alcohol having 1 to 3 carbon atoms and (meth) acrylic acid, may also be included, unless the physical properties of the polymer (A1) are not deteriorated.

As the radical-polymerizable monomer (a5), a monomer that does not contain activated hydrogen is preferred, and monomers of the following (a51) to (a58) can be used.

(a51) Hydrocarbyl (meth)acrylate formed from linear aliphatic monool having 13 to 20 carbon atoms, alicyclic monool having 5 to 20 carbon atoms, or aromatic aliphatic monool having 7 to 20 carbon atoms and (meth)acrylic acid Examples of the monool include (i) a linear aliphatic monool (tridecyl alcohol, myristyl alcohol, pentadecyl alcohol, cetyl alcohol, heptadecyl alcohol, stearyl alcohol, nonadecyl alcohol, arachidyl alcohol, or the like), (ii) alicyclic monool (cyclopentyl alcohol, cyclohexyl alcohol, cycloheptyl alcohol, cyclooctyl alcohol, or the like), (iii) aromatic aliphatic monool (benzyl alcohol, or the like), and mixtures of two or more kinds of these.

(a52) Poly (n=2 to 30) oxyalkylene (carbon number 2 to 4) alkyl (carbon number 1 to 18) ether (meth)acrylate [(meth)acrylate of a 10-mol ethylene oxide (hereinafter, abbreviated to EO) adduct of methanol, (meth)acrylate of a 10-mol propylene oxide (hereinafter, abbreviated to PO) adduct of methanol, or the like]

(a53) Nitrogen-Containing Vinyl Compounds (a53-1) Amide Group-Containing Vinyl Compound (i) A (meth)acrylamide compound having 3 to 30 carbon atoms, for example, N,N-dialkyl (carbon number 1 to 6) or diaralkyl (carbon number 7 to 15) (meth)acrylamide (N,N-dimethyl acrylamide, N,N-dibenzyl acrylamide, or the like), diacetone acrylamide (ii) Amide group-containing vinyl compound having 4 to 20 carbon atoms, except for the (meth)acrylamide compound described above, for example, N-methyl-N-vinylacetamide, a cyclic amide [pyrrolidone compound (carbon number 6 to 13, for example, N-vinylpyrrolidone, or the like)]

(a53-2) (Meth)Acrylate Compound (i) A dialkyl (carbon number 1 to 4) aminoalkyl (carbon number 1 to 4) (meth)acrylate [N,N-dimethylaminoethyll (meth)acrylate, N,N-diethylaminoethyl (meth) acrylate, t-butylaminoethyl (meth)acrylate, morpholinoethyl (meth) acrylate, or the like]

(ii) A quaternization product (product that has been quaternized using a quaternizing agent such as methyl chloride, dimethylsulfuric acid, benzyl chloride, or dimethyl carbonate) of a quaternary ammonium group-containing (meth) acrylate {tertiary amino group-containing (meth)acrylate [N,N-dimethylaminoethyl (meth)acrylate, N,N-diethylaminoethyl (meth)acrylate, or the like] or the like}

(a53-3) Heterocyclic Ring-Containing Vinyl Compound

A pyridine compound (carbon number 7 to 14, for example, 2- or 4-vinylpyridine), an imidazole compound (carbon number 5 to 12, for example, N-vinylimidazole), a pyrrole compound (carbon number 6 to 13, for example, N-vinylpyrrole), or a pyrrolidone compound (carbon number 6 to 13, for example, N-vinyl-2-pyrrolidone)

(a53-4) Nitrile Group-Containing Vinyl Compound

A nitrile group-containing vinyl compound having 3 to 15 carbon atoms, for example, (meth)acrylonitrile, cyanostyrene, or a cyanoalkyl (carbon number 1 to 4) acrylate (a53-5) Other Nitrogen-Containing Vinyl Compounds A nitro group-containing vinyl compound (carbon number 8 to 16, for example, nitrostyrene) and the like (a54) Vinyl Hydrocarbons (a54-1) Aliphatic Vinyl Hydrocarbon An olefin having 2 to 18 carbon atoms or more (ethylene, propylene, butane, isobutylene, pentene, heptane, diisobutylene, octene, dodecene, octadecene, or the like), a diene having 4 to 10 carbon atoms or more (butadiene, isoprene, 1,4-pentadiene, 1,5-hexadiene, 1,7-octadiene, or the like), or the like (a54-2) Alicyclic Vinyl Hydrocarbon A cyclic unsaturated compound having 4 to 18 carbon atoms or more, for example, a cycloalkene (for example, cyclohexene), a (di)cycloalkadiene [for example, (di)cyclopentadiene], a terpene (for example, pynene and limonene), or indene (a54-3) Aromatic Vinyl Hydrocarbon An aromatic unsaturated compound having 8 to 20 carbon atoms or more, for example, styrene, α-methylstyrene, vinyltoluene, 2,4-dimethylstyrene, ethylstyrene, isopropylstyrene, butylstyrene, phenylstyrene, cyclohexylstyrene, or benzylstyrene (a55) Vinyl Ester An aliphatic vinyl ester [carbon number 4 to 15, for example, an alkenyl ester of an aliphatic carboxylic acid (mono- or dicarboxylic acid) (for example, vinyl acetate, vinyl propionate, vinyl butyrate, diallyl adipate, isopropenyl acetate, or vinyl methoxyacetate)]

An aromatic vinyl ester [carbon number 9 to 20, for example, an alkenyl ester of an aromatic carboxylic acid (mono- or dicarboxylic acid) (for example, vinyl benzoate, diallyl phthalate, or methyl-4-vinyl benzoate), an aromatic ring-containing ester of an aliphatic carboxylic acid (for example, acetoxystyrene)]

(a56) Vinyl Ether

An aliphatic vinyl ether [carbon number 3 to 15, for example, a vinyl alkyl (carbon number 1 to 10) ether (vinyl methyl ether, vinyl butyl ether, vinyl 2-ethylhexyl ether, or the like), a vinyl alkoxy (carbon number 1 to 6)-alkyl (carbon number 1 to 4) ether (vinyl-2-methoxyethyl ether, methoxybutadiene, 3,4-dihydro-1,2-pyran, 2-butoxy-2'-vinyloxydiethyl ether, vinyl-2-ethyl mercaptoethyl ether, or the like), a poly (2 to 4) (meth)allyloxyalkane (carbon number 2 to 6) (diallyloxyethane, triallyloxyethane, tetrallyloxybutane, tetramethallyloxyethane, or the like)], an aromatic vinyl ether (carbon number 8 to 20, for example, vinyl phenyl ether or phenoxystyrene)

(a57) Vinyl Ketone

An aliphatic vinyl ketone (carbon number 4 to 25, for example, vinyl methyl ketone or vinyl ethyl ketone), an aromatic vinyl ketone (carbon number 9 to 21, for example, vinyl phenyl ketone)

(a58) Unsaturated Ciarboxylic Acid Diester

An unsaturated dicarboxylic acid diester having 4 to 34 carbon atoms, for example, a dialkyl fumarate (two alkyl groups are linear, branched, or alicyclic groups each having 1 to 22 carbon atoms), or a dialkyl maleate (two alkyl groups are linear, branched, or alicyclic groups each having 1 to 22 carbon atoms)

Among those listed as examples as (a5), preferred examples from the viewpoint of voltage resistance include (a51), (a52), and (a53).

In regard to the polymer (A1), the contents of the vinyl monomer (a1) having a carboxyl group or an acid anhydride group, the vinyl monomer (a2) represented by the General Formula (1), the ester compound (a3) of a monohydric aliphatic alcohol having 1 to 3 carbon atoms and (meth) acrylic acid, the salt (a4) of an anionic monomer having a polymerizable unsaturated double bond and an anionic group, and the radical polymerizable monomer (a5), are preferably 0.1% to 80% by weight of (a1), 0.1% to 99.9% by weight of (a2), 0% to 60% by weight of (a3), 0% to 15% by weight of (a4), and 0% to 99.8% by weight of (a5) based on the weight of the polymer (A1). When the contents of the monomers are in the above-mentioned ranges, the liquid absorptivity for the non-aqueous liquid electrolyte becomes satisfactory.

A preferred lower limit of the number average molecular weight of the polymer (A1) is 3,000, more preferably 50,000, even more preferably 100,000, and particularly preferably 200,000. A preferred upper limit is 2,000,000, more preferably 1,500,000, even more preferably 1,000,000, and particularly preferably 800,000.

The number average molecular weight of the polymer (A1) can be determined by gel permeation chromatography (hereinafter, abbreviated to GPC) measurement under the following conditions.

Apparatus: Alliance GPC V2000 (manufactured by Waters Corp.)
Solvent: Ortho-dichlorobenzene
Standard substance: Polystyrene
Detector: RI
Sample concentration: 3 mg/ml
Column stationary phase: PLgel 10 μm, MIXED-B two columns in series (manufactured by Polymer Laboratories, Ltd.)
Column temperature: 135° C.

The polymer (A1) can be produced by a known polymerization method (bulk polymerization, solution polymerization, emulsion polymerization, suspension polymerization, or the like) using a known polymerization initiator {an azo-based initiator [2,2'-azobis(2-methylpropionitrile), 2,2'-azobis(2-methylbutyronitrile), 2,2'-azobis(2,4-dimethylvaleronitrile), or the like], a peroxide-based initiator (benzoyl peroxide, di-t-butyl peroxide, lauryl peroxide, or the like) or the like}.

The amount of use of the polymerization initiator is, from the viewpoint of adjusting the number average molecular weight to a preferable range, or the like, preferably 0.01% to 5% by weight, more preferably 0.05% to 2% by weight, and even more preferably 0.1% to 1.5% by weight, based on the total weight of the monomers. The polymerization temperature and polymerization time are adjusted according to the type of the polymerization initiator or the like; however, the polymerization temperature is preferably −5° C. to 150° C. (more preferably 30° C. to 120° C.), and the reaction time is preferably 0.1 to 50 hours (more preferably 2 to 24 hours).

As the solvent used in the case of solution polymerization, for example, an ester (carbon number 2 to 8, for example, ethyl acetate and butyl acetate), an alcohol (carbon number 1 to 8, for example, methanol, ethanol, and octanol), a hydrocarbon (carbon number 4 to 8, for example, n-butane, cyclohexane, and toluene), and a ketone (carbon number 3 to 9, for example, methyl ethyl ketone), and an amide (for example, dimethyl formamide (hereinafter, abbreviated to DMF), dimethyl acetamide, or N-methyl-2-pyrrolidone (hereinafter, abbreviated to NMP)) may be mentioned. From the viewpoint of adjusting the number average molecular weight to a preferable range, the amount of use of the solvent is preferably 5% to 900% by weight, more preferably 10% to 400% by weight, and even more preferably 30% to 300% by weight, based on the total weight of monomers. The monomer concentration is preferably 10% to 95% by weight, more preferably 20% to 90% by weight, and even more preferably 30% to 80% by weight.

As the dispersing medium for emulsion polymerization and suspension polymerization, water, an alcohol (for example, ethanol), an ester (for example, ethyl propionate), light naphtha, and the like may be mentioned. Examples of the emulsifier include a higher fatty acid (carbon number 10 to 24) metal salt (for example, sodium oleate and sodium stearate), a higher alcohol (carbon number 10 to 24) sulfuric acid ester metal salt (for example, sodium lauryl sulfate), ethoxylated tetramethyl decynediol, sodium sulfoethyl methacrylate, dimethylaminomethyl methacrylate, and the like. Furthermore, polyvinyl alcohol, polyvinylpyrrolidone, or the like may be added as a stabilizer.

The monomer concentration of the solution or dispersion liquid is preferably 10% to 95% by weight, more preferably 20% to 90% by weight, and even more preferably 30% to 80% by weight. The amount of use of the polymerization initiator in the solution or dispersion liquid is preferably 0.01% to 5% by weight, and more preferably 0.05% to 2% by weight, based on the total weight of monomers.

Upon polymerization, a known chain transfer agent, for example, a mercapto compound (dodecylmercaptan, n-butylmercaptan, or the like) and/or a halogenated hydrocarbon (carbon tetrachloride, carbon tetrabromide, benzyl chloride, or the like) can be used.

The polymer (A1) included in the vinyl resin may be a crosslinked polymer formed by crosslinking the polymer (A1) with a crosslinking agent (A') having a reactive functional group that reacts with a carboxyl group {preferably, a polyepoxy compound (a'1) [polyglycidyl ether (bisphenol A diglycidyl ether, propylene glycol diglycidyl ether, glycerin triglycidyl ether, and the like), and polyglycidylamine (N,N-diglycidylaniline and 1,3-bis(N,N-diglycidylaminomethyl)) and the like] and/or a polyol compound (a'2) (ethylene glycol or the like)}.

As a method of crosslinking the polymer (A1) using a crosslinking agent (A'), a method of coating the positive electrode active material with the polymer (A1) and then performing crosslinking may be mentioned. Specifically, a method of producing a coated positive electrode active material in which the positive electrode active material is coated with the polymer (A1), by mixing a resin solution including the positive electrode active material and the polymer (A1) and removing the solvent, subsequently causing solvent removal and a crosslinking reaction by mixing a solution including the crosslinking agent (A') with the coated positive electrode active material and heating the mixture, and thereby causing a reaction b which the polymer (A1) is crosslinked by the crosslinking agent (A') to become a polymer compound, at the surface of the positive electrode active material, may be mentioned. The heating temperature is adjusted according to the type of the crosslinking agent; however, in a case where a polyepoxy compound (a'1) is used as the crosslinking agent, the heating temperature is preferably 70° C. or higher, and in a case where a polyol compound (a'2) is used, the heating temperature is preferably 120° C. or higher.

The coating layer may further include an electrically conductive agent, and as the electrically conductive agent that can be included in the coating layer, an agent similar to the electrically conductive material that is included in the resin current collector can be suitably used. The same also applies to a preferable form, the average particle size, and the like.

The proportion of the total weight of the polymer compound and the electrically conductive agent included in the coating layer is not particularly limited; however, the proportion is preferably 0% to 25% by weight with respect to the weight of the positive electrode active material.

The proportion of the weight of the polymer compound with respect to the weight of the positive electrode active material is not particularly limited; however, the proportion is preferably 0.1% to 11% by weight. The proportion of the weight of the electrically conductive agent with respect to the weight of the positive electrode active material is not particularly limited; however, the proportion is preferably 0% to 14% by weight.

A method for producing the above-mentioned coated positive electrode active material will be described below. The coated positive electrode active material can be produced by, for example, mixing a polymer compound and a positive electrode active material. In a case where the coating layer contains an electrically conductive agent, for example, production may be carried out by mixing a polymer compound, an electrically conductive agent, and a positive electrode active material, or production may also be carried out by preparing a coating material by mixing a polymer compound with an electrically conductive agent, and then mixing the coating material with a positive electrode active material. By means of the above-described method, at least a portion of the surface of the positive electrode active material is coated with a coating layer containing a polymer compound.

As the positive electrode active material and the polymer compound, the ones described in connection with the coated positive electrode active material can be suitably used.

Regarding the coated positive electrode active material, for example, in a state in which a positive electrode active material has been introduced into a universal mixer and stirred at 300 to 1,000 rpm, a polymer solution including a polymer compound is added dropwise and mixed for 1 to 90 minutes, and the mixture is further stirred as necessary. Furthermore, if necessary, an electrically conductive agent is mixed, and then, if necessary, stirring is continued for 10 minutes to 1 hour. While being stirred, the pressure is reduced to 0.007 to 0.04 MPa, and then while stirring and the degree of pressure reduction are maintained, temperature is increased to 50° C. to 200° C., and the mixture is maintained for 10 minutes to 10 hours, and preferably for 1 to 10 hours. Thereby, the coated positive electrode active material can be obtained. Subsequently, the coated positive electrode active material obtained as a powder may be classified.

The mixing ratio of the positive electrode active material and the polymer compound is not particularly limited; however, the weight ratio is preferably such that positive electrode active material:polymer compound=1:0.001 to 1:0.1.

Subsequently, a method for producing a positive electrode for a lithium ion battery of the present invention will be described. As the method for producing a positive electrode for a lithium ion battery of the present invention, for example, a method of applying a dispersion liquid, which has been obtained by dispersing a positive electrode active material and an electrically conductive agent that is used as necessary at a concentration of 30% to 70% by weight based on the weight of a non-aqueous liquid electrolyte or a non-aqueous solvent of a non-aqueous liquid electrolyte and slurrifying the dispersion, on a positive electrode current collector using a coating apparatus such as a bar coater, subsequently drying the dispersion liquid as necessary so as to remove the non-aqueous liquid electrolyte or the non-aqueous solvent of the non-aqueous liquid electrolyte to obtain a positive electrode active material layer, pressing as necessary the positive electrode active material layer with a pressing machine, and impregnating the positive electrode active material layer thus obtained with a predetermined amount of a non-aqueous liquid electrolyte, may be mentioned. Meanwhile, it is not necessary to form the positive electrode active material layer obtained from the dispersion liquid directly on the positive electrode current collector, and for example, a positive electrode active material layer obtainable by applying the above-mentioned dispersion liquid on the surface of an aramid separator or the like, may be disposed so as to come in contact with a positive electrode current collector.

Furthermore, drying that is carried out as necessary after the dispersion liquid is applied can be carried out using a known dryer such as a fair wind type dryer, and the drying temperature can be adjusted according to the type of the dispersing medium (non-aqueous liquid electrolyte, the non-aqueous solvent of a non-aqueous liquid electrolyte, or the like) included in the dispersion liquid.

To the dispersion liquid, a binder such as polyvinylidene fluoride (PVdF) that is included in a positive electrode for a known lithium ion battery may be added as necessary; however, in a case where the positive electrode active material is the coated positive electrode active material described above, it is preferable that a binder is not added. Specifically, the content of the binder is preferably 1% by weight or less, more preferably 0.5% by weight or less, even more preferably 0.2% by weight or less, particularly preferably 0.1% by weight or less, and most preferably 0% by weight, based on 100% by weight of the total solid content included in the positive electrode active material layer.

Here, a binder is a polymer material that is added in order to bind the positive electrode active material particles and other members and maintain the structure of the positive electrode active material layer, and does not include the polymer compound for a coating layer that is included in the coating layer. A binder is an insulating material and is a material that does not cause a side reaction (oxidation-reduction reaction) at the time of charging and discharging. Generally, the binder satisfies the following three points: (1) maintaining the slurry used for the production of an active material layer in a stable state (having a dispersing action or a thickening action); (2) fixing the particles of the electrode active material, electrical conduction aid, and the like, maintaining the mechanical strength as an electrode, and maintains electrical contact between particles; and (3) having adhesive force (binding force) to a current collector. With regard to conventional positive electrodes for lithium ion batteries, it is necessary to maintain the conductive path by fixing the positive electrode active material inside the positive electrode with a binder. However, in a case where a coated positive electrode active material is used, the conductive path can be maintained by the function of the coating layer without fixing the positive electrode active material within the positive electrode, and therefore, it is not necessary to add a binder. When a binder is not added, since the positive electrode active material is not fixed within the positive electrode, the relaxation ability against volume change of the positive electrode active material becomes more satisfactory. When the relaxation ability against volume change of the positive electrode active material is satisfactory as the positive electrode active material layer does not include a binder, and even in a case where the thickness of the positive electrode active material layer is made thick, the positive electrode active material layer does not detach from the positive electrode current collector along with repeated charging and discharging. Therefore, an increase in the internal resistance does not easily occur. Therefore, deterioration of the cycle characteristics can be suppressed while the energy density is increased.

In a case where a binder is added to a dispersion liquid obtained by slurrifying a positive electrode active material, from the viewpoint that an active material layer can be molded while having a sufficient amount of voids formed in the positive electrode active material layer, the amount of addition of the binder is preferably 0.1% to 20% by weight with respect to the solid content weight of the slurry.

Examples of the binder include starch, polyvinylidene fluoride, polyvinyl alcohol, carboxymethyl cellulose, polyvinylpyrrolidone, tetrafluoroethylene, styrene-butadiene rubber, polyethylene, polypropylene, and the like.

The pressure at the time of pressing a dried slurry is not particularly limited; however, when the pressure is too high, a sufficient amount of voids cannot be formed in the positive electrode active material layer, and when the pressure is too low, an effect brought by pressing is not observed. Therefore, it is preferable to press at 1 to 200 MPa.

A preferred embodiment of the positive electrode current collector is as described above.

The positive electrode for a lithium ion battery of the present invention is such that the dispersing medium is a non-aqueous liquid electrolyte, a non-aqueous solvent of a non-aqueous liquid electrolyte, or the like, and in a case where a coated dispersion liquid is dried, the positive electrode is obtained by impregnating the positive electrode active material layer obtained after drying, with the non-aqueous liquid electrolyte. The weight of the non-aqueous liquid electrolyte to be impregnated into the positive electrode active material layer can be adjusted according to the amount of voids in the positive electrode active material layer and the electrolyte concentration of the non-aqueous liquid electrolyte.

Impregnation of the non-aqueous liquid electrolyte into the positive electrode active material layer can be carried out by a method of dropping the non-aqueous liquid electrolyte onto the surface of a positive electrode active material layer formed by the above-described method, using a dropper or the like, and impregnating the positive electrode active material layer, or the like.

The lithium ion battery of the present invention is a battery that uses the positive electrode for a lithium ion battery as described above, and can be produced by a method of combining the positive electrode with an electrode that serves as a counter electrode of the positive electrode for a lithium ion battery described above, accommodating the electrodes in a cell container together with a separator, pouring a non-aqueous liquid electrolyte, and sealing the cell container, or the like.

Furthermore, in the positive electrode for a lithium ion battery of the present invention having a positive electrode active material layer formed on one surface of a positive electrode current collector, a negative electrode active material layer containing a negative electrode active material is formed on the other surface of the positive electrode current collector, and thus a bipolar electrode is produced. The bipolar electrode is laminated with a separator and is accommodated in a cell container, a non-aqueous liquid electrolyte is poured, and the cell container is tightly sealed. The lithium ion battery is also obtained thereby.

As the separator, known separators for lithium ion batteries, such as a fine porous film made of polyethylene or polypropylene; a laminate film of a porous polyethylene film and a porous polypropylene; a nonwoven fabric containing synthetic fibers (polyester fibers, aramid fibers, and the like), glass fibers, or the like; and products obtained by attaching ceramic microparticles of silica, alumina, titania, and the like to the surfaces of those, may be mentioned.

As the non-aqueous liquid electrolyte, the one described for the positive electrode for a lithium ion battery of the present invention can be suitably used.

Regarding the electrode that serves as a counter electrode of the above-described positive electrode for a lithium ion battery (negative electrode), a negative electrode that is used for known lithium ion batteries can be used.

The lithium ion battery of the present invention is characterized by using the positive electrode for a lithium ion battery of the present invention. Since the lithium ion battery of the present invention uses the positive electrode for a lithium ion battery of the present invention, it is capable of rapid discharging and has high energy density.

EXAMPLES

Next, the present invention will be specifically described by way of Examples; however, as long as the gist of the present invention is maintained, the present invention is not intended to be limited to the Examples. Meanwhile, unless particularly stated otherwise, parts mean parts by weight, and % means % by weight.

Production Example 1: Production of Polymer Compound for Coating Layer and Solution Thereof Into a four-necked flask equipped with a stirrer, a thermometer, a reflux cooling tube, a dropping funnel, and a nitrogen gas inlet tube, 407.9 parts of DMF was introduced, and the temperature was increased to 75° C. Next, a monomer mixed liquid obtained by mixing 242.8 parts of methacrylic acid, 97.1 parts of methyl methacrylate, 242.8 parts of 2-ethylhexyl methacrylate, and 116.5 parts of DMF, and an initiator solution obtained by dissolving 1.7 parts of 2,2'-azobis(2,4-dimethylvaleronitrile) and 4.7 parts of 2,2'-azobis(2-methylbutyronitrile) in 58.3 parts of DMF were continuously added dropwise, with stirring, into the four-necked flask for 2 hours with a dropping funnel while nitrogen was blown into the flask, and thus radical polymerization was performed. After completion of dropwise addition, a reaction was continued for 3 hours at 75° C. Next, the temperature was increased to 80° C., and the reaction was continued for 3 hours. Thus, a copolymer solution having a resin concentration of 50% was obtained. To this, 789.8 parts of DMF was added, and a solution of a polymer compound for a coating layer having a resin solid content concentration of 30% by weight was obtained. The number average molecular weight of the polymer compound for a coating layer thus obtained, as measured by GPC, was 70,000±10,000.

Production Example 2: Production of Coated Positive Electrode Active Material Particles 100 parts of a positive electrode active material powder ($LiNi_{0.8}Co_{0.15}Al_{0.05}O_2$ powder, volume average particle size 4 μm) was introduced into a universal mixer, HIGH SPEED MIXER FS25 [manufactured by Earthtechnika Co., Ltd.], and in a state in which the carbon powder was stirred at 720 rpm at room temperature, 6.1 parts of the solution of the polymer compound for a coating layer obtained in the Production Example 1 was added dropwise for 2 minutes. Furthermore, stirring was performed for 5 minutes.

Next, in a state of being stirred, 6.1 parts of acetylene black [DENKA BLACK (registered trademark) manufactured by Denka Co., Ltd.], which is an electrically conductive agent, was introduced in divided portions for 2 minutes, and stirring was continued for 30 minutes. Subsequently, while stirring was maintained, pressure was reduced to 0.01 MPa. Subsequently, while stirring and the degree of pressure reduction were maintained, temperature was raised to 140° C., and stirring, the degree of pressure reduction, and the temperature were maintained for 8 hours. Thus, a volatile fraction was distilled off. A powder thus obtained was classified with a sieve having a mesh size of 212 µm, and coated positive electrode active material particles were obtained.

Example 1

[Production of Positive Electrode Active Material Slurry for Lithium Ion Battery]

20 parts of a non-aqueous liquid electrolyte produced by dissolving $LiN(FSO_2)_2$ at a proportion of 3 mol/L in a mixed solvent of ethylene carbonate (EC) and diethyl carbonate (DEC) (volume ratio 1:1), and 2 parts of carbon fibers [DONACARBO MILLED S-243 manufactured by Osaka Gas Chemicals Co., Ltd.: average fiber length 500 µm, average fiber diameter 13 µm: electrical conductivity 200 mS/cm] were mixed for 7 minutes at 2,000 rpm using a planetary stirring type mixing and kneading apparatus {AWATORI RENTARO [manufactured by Thinky Corporation]}. Subsequently, 50 parts of the non-aqueous liquid electrolyte and 98 parts of the coated positive electrode active material particles produced in the Production Example 2 were added. Subsequently, the mixture was mixed for 1.5 minutes at 2,000 rpm with AWATORI RENTARO, and 25 parts of the non-aqueous liquid electrolyte was further added. Subsequently, stirring by AWATORI RENTARO was carried out for 1 minute at 2,000 rpm, and 50 parts of the non-aqueous liquid electrolyte was further added. Subsequently, stirring by AWATORI RENTARO was mixed for 1.5 minutes at 2,000 rpm, and thereby a positive electrode active material slurry was produced.

[Production of Positive Electrode for Lithium Ion Battery and Lithium Ion Battery for Positive Electrode Evaluation]

The positive electrode active material slurry thus obtained was applied on one surface of an aramid separator [manufactured by Japan Vilene Co., Ltd.], and the resultant was pressed for about 10 seconds at a pressure of 10 MPa. Thus, a positive electrode active material layer (3 cm×3 cm) having a thickness of about 230 µm was fixed on the aramid separator. From the weight change of the aramid separator before and after the formation of the positive electrode active material layer, the weight per unit area (also referred to as basis weight amount) of the positive electrode active material layer was determined, and the value was 52 mg/cm². Furthermore, the positive electrode active material layer thus fixed was measured using an X-ray CT apparatus, and from an X-ray CT image thus obtained, the porosity was determined by the method described below. The porosity was 51% by volume.

First, X-ray CT images are obtained as cross-section images in two directions, namely, the thickness direction of the aramid separator and a direction perpendicular to this. Subsequently, with regard to regions of 50 µm×50 µm extracted randomly at 10 sites in a cross-section image in each direction, the areas occupied by voids in the entire region were respectively determined, and a value obtained by averaging these was designated as porosity.

Subsequently, a terminal (5 mm×3 cm)-attached carbon-coated aluminum foil (3 cm×3 cm, thickness 50 µm), one sheet of a separator [CELGARD (registered trademark) 3501 manufactured by Celgard, LLC., made of PP] (5 cm×5 cm), and a terminal (5 mm×3 cm)-attached copper foil (3 cm×3 cm, thickness 50 µm) were laminated in order in a direction in which the two terminals came out in the same direction. That laminate was interposed between two sheets of a commercially available thermal fusion type aluminum laminate film (8 cm×8 cm), and one edge through which the terminals came out was thermally fused. Thus, a laminate cell for positive electrode evaluation was produced. Next, an aramid separator (3 cm×3 cm) having a positive electrode active material layer fixed thereon was inserted between one of the carbon-coated aluminum foils and the separator, in a direction in which the positive electrode active material layer and the carbon-coated aluminum foil come into contact. Furthermore, 70 µL of a non-aqueous liquid electrolyte was poured into the electrode (positive electrode active material layer of 3 cm×3 cm), and the non-aqueous liquid electrolyte was absorbed into the electrode. Thereby, a positive electrode for a lithium ion battery according to Example 1 was produced. Next, 70 µL of the non-aqueous liquid electrolyte was poured onto the separator. Subsequently, a lithium foil was inserted between the separator and the copper foil, and two edges that orthogonally intersected the one edge that had been previously thermally fused were heat-sealed. Subsequently, 70 µL of the non-aqueous liquid electrolyte was poured through an opening, and the laminate cell was tightly sealed by heat-sealing the opening while the interior of the cell was brought into a vacuum using a vacuum sealer. Thus, lithium ion battery for positive electrode evaluation 1 was obtained.

From the porosity of the positive electrode active material layer and the concentration of the non-aqueous liquid electrolyte, the proportion of the battery capacity (hereinafter, also referred to as battery capacity proportion) based on the total amount of lithium ions in the non-aqueous liquid electrolyte existing in the positive electrode active material layer with respect to the battery capacity based on the total amount of the positive electrode active material was determined, and the proportion was 9.5%.

Example 2

A positive electrode for a lithium ion battery according to Example 2 and lithium ion battery for positive electrode evaluation 2 were produced by the same procedure as the Example 1, except that the electrolyte concentration of the non-aqueous liquid electrolyte was changed from 3 mol/L to 2 mol/L. The porosity of the positive electrode active material layer was the same as that of the Example 1. Furthermore, the battery capacity proportion was 6.3%.

Example 3

A positive electrode for a lithium ion battery according to Example 3 and lithium ion battery for positive electrode evaluation 3 were produced by the same procedure as the Example 1, except that the electrolyte concentration of the non-aqueous liquid electrolyte was changed from 3 mol/L to 1.2 mol/L. The porosity of the positive electrode active material layer was the same as that of the Example 1. Furthermore, the battery capacity proportion was 3.8%.

Example 4

A positive electrode for a lithium ion battery according to Example 4 and a lithium ion battery for positive electrode evaluation 4 were produced by a procedure similar to Example 2, except that the basis weight amount of the positive electrode active material was changed from 52 mg/cm² to 80 mg/cm², and the pressing conditions after the positive electrode active material slurry was applied on an aramid separator were changed to about 10 seconds at 20 MPa so that the film thickness of the positive electrode active material layer would be 320 μm, and the porosity would be 46% by volume. The film thickness of the positive electrode active material layer was 320 μm, and the porosity was 46% by volume. Furthermore, the battery capacity proportion was 5.1%.

Example 5

A positive electrode for a lithium ion battery according to Example 5 and a lithium ion battery for positive electrode evaluation 5 were produced by a procedure similar to Example 4, except that the electrolyte concentration of the non-aqueous liquid electrolyte was changed from 2 mol/L to 5 mol/L. The porosity of the positive electrode active material layer was similar to that of Example 4. Furthermore, the battery capacity proportion was 12.7%.

Example 6

A positive electrode for a lithium ion battery according to Example 6 and a lithium ion battery for positive electrode evaluation 6 were produced by a procedure similar to Example 4, except that the electrolyte of the non-aqueous liquid electrolyte was changed from $LiN(FSO_2)_2$ to $LiPF_6$, and the pressing conditions after the positive electrode active material slurry was applied on an aramid separator were changed to about 10 seconds at 8 MPa so that the film thickness of the positive electrode active material layer would be 390 μm, and the porosity would be 55% by volume. The film thickness of the positive electrode active material was 390 μm, and the porosity was 55% by volume. Furthermore, the battery capacity proportion was 7.4%.

Example 7

A positive electrode for a lithium ion battery according to Example 7 and a lithium ion battery for positive electrode evaluation 7 were produced by a procedure similar to Example 6, except that the electrolyte concentration of the non-aqueous liquid electrolyte was changed from 2 mol/L to 3 mol/L, the type of the electrolyte was changed from $LiN(FSO_2)_2$ to a mixture of $LiPF_6$: $LiN(CF_3SO_2)_2$=1:1 (weight ratio), and the pressing conditions after the positive electrode active material slurry was applied on an aramid separator were changed to about 10 seconds at 40 MPa so that the film thickness of the positive electrode active material would be 280 μm, and the porosity would be 38% by volume. The basis weight amount of the positive electrode active material was 80 mg/cm², the film thickness of the positive electrode active material layer was 280 mm, and the porosity was 38% by volume. Furthermore, the battery capacity proportion was 5.6%.

Example 8

A positive electrode for a lithium ion battery according to Example 8 and a lithium ion battery for positive electrode evaluation 8 were produced by a procedure similar to Example 1, except that the basis weight amount of the positive electrode active material was changed from 52 mg/cm² to 160 mg/cm², and the pressing conditions after the positive electrode active material slurry was applied on an aramid separator were changed to about 10 seconds at 8 MPa so that the film thickness of the positive electrode active material layer would be 770 μm, and the porosity would be 55% by volume. The film thickness of the positive electrode active material layer was 770 μm, and the porosity was 55% by volume. Furthermore, the battery capacity proportion was 11.0%.

Comparative Example 1

A positive electrode for a lithium ion battery according to Comparative Example 1 and lithium ion battery for positive electrode comparative evaluation 1 were produced by the same procedure as the Example 1, except that the electrolyte concentration of the non-aqueous liquid electrolyte was changed from 3 mol/L to 0.8 mol/L. The porosity of the positive electrode active material layer was the same as that of the Example 1. Furthermore, the battery capacity proportion was 2.5%.

Comparative Example 2

The electrolyte concentration of the non-aqueous liquid electrolyte was changed from 3 mol/L to 5.5 mol/L in the Example 1; however, since the electrolyte salt was precipitated within the liquid electrolyte, and a non-aqueous liquid electrolyte that can be used for a battery could not be produced, production of a battery was not carried out. Meanwhile, the battery capacity proportion in a case where it was assumed that a battery was produced in the same manner as in the Example 1 using a non-aqueous liquid electrolyte having an electrolyte concentration of 5.5 mol/L, was 17.3%.

Comparative Example 3

A positive electrode for a lithium ion battery according to Comparative Example 3 and a lithium ion battery for positive electrode comparative evaluation 3 were produced by a procedure similar to Example 1, except that the electrolyte concentration of the non-aqueous liquid electrolyte was changed from 3 mol/L to 1.2 mol/L, the type of the electrolyte was changed from $LiN(FSO_2)_2$ to $LiPF_6$, the basis weight amount of the positive electrode active material was changed from 52 mg/cm² to 80 mg/cm², and the pressing conditions after the positive electrode active material slurry was applied on an aramid separator were changed to about 10 seconds at 50 MPa. The porosity of the positive electrode active material layer was 30% by volume, and the film thickness was 250 mm. Furthermore, the battery capacity proportion was 1.6%.

Comparative Example 4

A positive electrode for a lithium ion battery according to Comparative Example 4 and a lithium ion battery for positive electrode comparative evaluation 4 were produced by a procedure similar to Example 6, except that the electrolyte concentration of the non-aqueous liquid electrolyte was changed from 2 mol/L to 0.8 mol/L. The porosity and film thickness of the positive electrode active material layer were similar to those of Example 6. Furthermore, the battery capacity proportion was 3.0%.

<Measurement of Discharge Capacity of Positive Electrode Active Material>

The coated positive electrode active material particles produced in Production Example 2 were mixed with a non-aqueous liquid electrolyte produced by dissolving LiN(FSO$_2$)$_2$ at a proportion of 3 mol/L in a mixed solvent of ethylene carbonate (EC) and diethyl carbonate (DEC) (volume ratio 1:1), the mixture was slurrified, and the slurry was applied on one surface of an aramid separator [manufactured by Japan Vilene Co., Ltd.]. Subsequently, the resultant was pressed for 10 seconds at a pressure of 10 MPa to produce an electrode, and the electrode was incorporated into a battery pack. The discharge capacity at the time of performing discharging from 4.2V to 2.5 V was measured with a charge-discharge analyzer "Battery Analyzer Type 1470" [manufactured by TOYO Corporation], and the discharge capacity (4.2V→2.5 V discharge capacity) of the positive electrode active material was determined. The results were 192 mAh/g.

<Measurement of Discharge Capacity at the Time of High Rate>

Evaluation of lithium ion batteries for positive electrode evaluation 1 to 8 and lithium ion batteries for positive electrode comparative evaluation 1, 3, and 4 was carried out by the following method at room temperature using a charge-discharge analyzer "Battery Analyzer Type 1470" [manufactured by TOYO Corporation].

Under the conditions of 45° C., the capacity (1.0 C discharge capacity) obtainable at the time of charging each of the lithium ion batteries for positive electrode evaluation 1 to 8 and the lithium ion batteries for positive electrode comparative evaluation 1, 3, and 4 up to 4.2 V with a current of 0.05 C, and then discharging each to 2.5 V with a current of 1.0 C, was measured. The proportion [%] of the 1.0 C discharge capacity with respect to the battery capacity based on the total amount of the positive electrode active material was determined by the formula: [(1.0 C discharge capacity)/(battery capacity based on total amount of positive electrode active material)×100], and the results are described in Tables 1 and 2. As the 1.0 C discharge capacity with respect to the battery capacity is larger, it is more satisfactory, and it means that high-speed discharging is enabled.

TABLE 1

|  |  | Example 1 | Example 2 | Example 3 | Example 4 | Example 5 |
|---|---|---|---|---|---|---|
| Non-aqueous liquid electrolyte | Electrolyte salt | LiN(FSO$_2$)$_2$ | LiN(FSO$_2$)$_2$ | LiN(FSO$_2$)$_2$ | LiN(FSO$_2$)$_2$ | LiN(FSO$_2$)$_2$ |
|  | Concentration [mol/L] | 3 | 2 | 1.2 | 2 | 5 |
| Positive electrode active material layer | Film thickness [μm] | 230 | 230 | 230 | 320 | 320 |
|  | Porosity [vol %] | 51 | 51 | 51 | 46 | 46 |
| Battery capacity | Battery capacity based on total amount of positive electrode active material [mAh/cm$^2$] | 10.0 | 10.0 | 10.0 | 15.4 | 15.4 |
|  | Battery capacity based on total amount of lithium ions [mAh/cm$^2$] | 0.95 | 0.63 | 0.38 | 0.78 | 1.95 |
|  | Battery capacity proportion [%] | 9.5 | 6.3 | 3.8 | 5.1 | 12.7 |
| Evaluation (battery evaluation at 45° C.) | 1.0 C discharge capacity [mAh/cm$^2$] | 6.7 | 8.2 | 5.7 | 7.4 | 5.9 |
|  | Proportion of 1.0 C discharge capacity with respect to battery capacity [%] | 67 | 82 | 57 | 48 | 38 |

|  |  | Example 6 | Example 7 | Example 8 |
|---|---|---|---|---|
| Non-aqueous liquid electrolyte | Electrolyte salt | LiPF$_6$ | LiPF$_6$/LiN(CF$_3$SO$_2$)$_2$ (1/1) | LiN(FSO$_2$)$_2$ |
|  | Concentration [mol/L] | 2 | 3 | 3 |
| Positive electrode active material layer | Film thickness [μm] | 390 | 280 | 770 |
|  | Porosity [vol %] | 55 | 38 | 55 |
| Battery capacity | Battery capacity based on total amount of positive electrode active material [mAh/cm$^2$] | 15.4 | 15.4 | 30.7 |
|  | Battery capacity based on total amount of lithium ions [mAh/cm$^2$] | 1.14 | 0.86 | 3.39 |
|  | Battery capacity proportion [%] | 7.4 | 5.6 | 11.0 |
| Evaluation (battery evaluation at 45° C.) | 1.0 C discharge capacity [mAh/cm$^2$] | 5.5 | 5.2 | 5.1 |
|  | Proportion of 1.0 C discharge capacity with respect to battery capacity [%] | 36 | 34 | 17 |

TABLE 2

|  |  | Comparative Example 1 | Comparative Example 2 | Comparative Example 3 | Comparative Example 4 |
|---|---|---|---|---|---|
| Non-aqueous liquid electrolyte | Electrolyte salt | $LiN(FSO_2)_2$ | $LiN(FSO_2)_2$ | $LiPF_6$ | $LiPF_6$ |
|  | Concentration [mol/L] | 0.8 | 5.5 | 1.2 | 0.8 |
| Positive electrode active material layer | Film thickness [μm] | 230 | (230)* | 250 | 390 |
|  | Porosity [vol %] | 51 | (51)* | 30 | 55 |
| Battery capacity | Battery capacity based on total amount of positive electrode active material [mAh/cm$^2$] | 10.0 | (10.0)* | 15.4 | 15.4 |
|  | Battery capacity based on total amount of lithium ions [mAh/cm$^2$] | 0.25 | (1.73)* | 0.24 | 0.46 |
|  | Battery capacity proportion [%] | 2.5 | (17.3)* | 1.6 | 3.0 |
| Evaluation (battery evaluation at 45° C.) | 1.0 C discharge capacity [mAh/cm$^2$] | 4.0 | — | 3.9 | 3.1 |
|  | Proportion of 1.0 C discharge capacity with respect to battery capacity [%] | 40 | — | 25 | 20 |

*The electrolyte salt was precipitated out in the non-aqueous liquid electrolyte, and a battery could not be formed. The value in ( ) is a value at the time of assuming that a battery was produced in the same manner as in Example 1 using a non-aqueous liquid electrolyte having an electrolyte salt concentration of 5.5 mol/L.

From Tables 1 and 2, it can be seen that lithium ion batteries that use the positive electrodes for lithium ion batteries of the present invention can have higher energy density and have excellent rapid discharging characteristics. In Tables 1 and 2, the proportions of the 1.0 C discharge capacity with respect to the battery capacities of Examples 5 to 8 are lower than Comparative Example 1; however, this is thought to be because the film thickness of the positive electrode active material layer affects the proportions. As shown by a comparison between Example 6 and Comparative Example 4 in Tables 1 and 2, it is thought that when the film thickness is the same, lithium ion batteries that use the positive electrodes for lithium ion batteries of the present invention have excellent rapid charging-discharging characteristics.

INDUSTRIAL APPLICABILITY

The positive electrode for a lithium ion battery of the present invention is useful particularly as a positive electrode for a bipolar secondary battery, for a lithium ion secondary battery, and the like, which are used for mobile telephones, personal computers, hybrid vehicles, and electric vehicles.

The present application is based on Japanese Patent Application 2016-217174, which was filed in Japan on Nov. 7, 2016, and Japanese Patent Application 2017-203993, which was filed in Japan on Oct. 20, 2017, the disclosures of which are incorporated herein by reference in their entirety.

The invention claimed is:

1. A positive electrode for a lithium ion battery, the positive electrode comprising:
    a positive electrode current collector;
    a positive electrode active material layer formed on a surface of the positive electrode current collector; and
    a non-aqueous liquid electrolyte including an electrolyte containing lithium ions and a non-aqueous solvent,
    wherein the positive electrode active material layer includes a positive electrode active material and voids, the voids are filled with the non-aqueous liquid electrolyte,
    a proportion of a battery capacity based on a total amount of lithium ions in the non-aqueous liquid electrolyte existing in the positive electrode active material layer with respect to a battery capacity based on a total amount of the positive electrode active material is 3.5 to 15%, and
    a concentration of the electrolyte of the non-aqueous liquid electrolyte is 2 to 5 mol/L.

2. The positive electrode for a lithium ion battery according to claim 1, wherein a proportion of a battery capacity based on a total amount of lithium ions in the non-aqueous liquid electrolyte existing in the positive electrode active material layer with respect to a battery capacity based on a total amount of the positive electrode active material is 5 to 15%.

3. The positive electrode for a lithium ion battery according to claim 1, wherein a thickness of the positive electrode active material layer is 100 to 900 μm.

4. The positive electrode for a lithium ion battery according to claim 1, wherein a total volume of the voids is 35% to 60% by volume of a total volume of the positive electrode active material layer.

5. The positive electrode for a lithium ion battery according to claim 1, wherein a concentration of the electrolyte of the non-aqueous liquid electrolyte is 2 to 3 mol/L.

6. The positive electrode for a lithium ion battery according to claim 1, wherein the electrolyte is a sulfonylimide-based electrolyte having a fluorine atom.

7. The positive electrode for a lithium ion battery according to claim 1, wherein the electrolyte includes at least $LiN(FSO_2)_2$.

8. The positive electrode for a lithium ion battery according to claim 1, wherein the electrolyte consists of $LiN(FSO_2)_2$.

9. The positive electrode for a lithium ion battery according to claim 1, wherein the positive electrode current collector is a resin current collector including an electrically conductive material and a resin.

10. The positive electrode for a lithium ion battery according to claim 1, wherein the positive electrode active material is a coated positive electrode active material in which a portion or an entirety of a surface of the positive electrode active material is coated with a coating layer including a polymer compound.

11. The positive electrode for a lithium ion battery according to claim 1, wherein the content of a binder in the positive electrode active material layer is 0.5% by weight or less based on 100% by weight of the total solid content included in the positive electrode active material layer.

12. A lithium ion battery using the positive electrode for a lithium ion battery according to claim 1.

* * * * *